United States Patent
Sullivan

[11] Patent Number: 6,039,521
[45] Date of Patent: Mar. 21, 2000

[54] TRUCK BED ENCLOSURE ATTACHMENT POSTS

[76] Inventor: William T. Sullivan, 318 Whiting Ct., Daphne, Ala. 36526

[21] Appl. No.: 08/784,069

[22] Filed: Jan. 17, 1997

[51] Int. Cl.[7] ..................................................... B60P 7/14
[52] U.S. Cl. ........................... 410/118; 410/129; 410/149; 410/151
[58] Field of Search ..................... 410/117, 118, 410/129, 140, 149, 151; 296/37.1, 24.1, 37.6, 50, 100.01, 100.11; 220/529, 536, 539; 224/42.33, 42.34

[56] References Cited

U.S. PATENT DOCUMENTS

| | | | |
|---|---|---|---|
| 2,594,208 | 4/1952 | Pilot | 410/129 |
| 3,044,800 | 7/1962 | Wicker | 296/24.1 X |
| 3,481,371 | 12/1969 | Row | 296/100.01 X |
| 3,767,253 | 10/1973 | Kluetsch | 410/118 |
| 3,995,565 | 12/1976 | Kersey | 410/151 |
| 4,763,944 | 8/1988 | Fry et al. | 296/50 |
| 4,930,834 | 6/1990 | Moore . | |
| 5,026,231 | 6/1991 | Moore | 410/118 |
| 5,076,630 | 12/1991 | Henriquez | 296/37.6 X |
| 5,117,532 | 6/1992 | Holland . | |
| 5,207,260 | 5/1993 | Commesso | 410/118 X |
| 5,263,761 | 11/1993 | Hathaway et al. | 296/37.6 X |
| 5,271,656 | 12/1993 | Hull et al. | 296/50 X |
| 5,273,339 | 12/1993 | Flynn . | |
| 5,393,115 | 2/1995 | Hamilton . | |
| 5,427,486 | 6/1995 | Green | 410/118 |
| 5,443,586 | 8/1995 | Cargill | 410/129 X |
| 5,452,973 | 9/1995 | Arvin | 410/118 |
| 5,586,850 | 12/1996 | Johnson | 410/129 X |

FOREIGN PATENT DOCUMENTS

| | | | |
|---|---|---|---|
| 251422 | 5/1926 | United Kingdom | 224/42.34 |
| 2191800 | 12/1987 | United Kingdom | 410/151 |

*Primary Examiner*—Stephen T. Gordon
*Attorney, Agent, or Firm*—Joseph H. McGlynn

[57] ABSTRACT

An improved device for attaching tailgate enclosures to a pickup truck. The device comprises attachment posts installed adjacent to the opposing interior sidewalls of a pickup truck. Each post has an upper cylinder, received telescopically into a lower cylinder and biased upward by a helical spring. Semi-rigid, textured plates are disposed at either end of the posts. Looped members are disposed on the cylinders, providing an attachment means for a net-type or other alternative tailgate enclosure. The posts are installed between the upper sidewall lip and the floor of the pickup bed at either side of the bed, being held in place by the force exerted on the upper plate by the helical spring.

7 Claims, 1 Drawing Sheet

U.S. Patent    Mar. 21, 2000    6,039,521
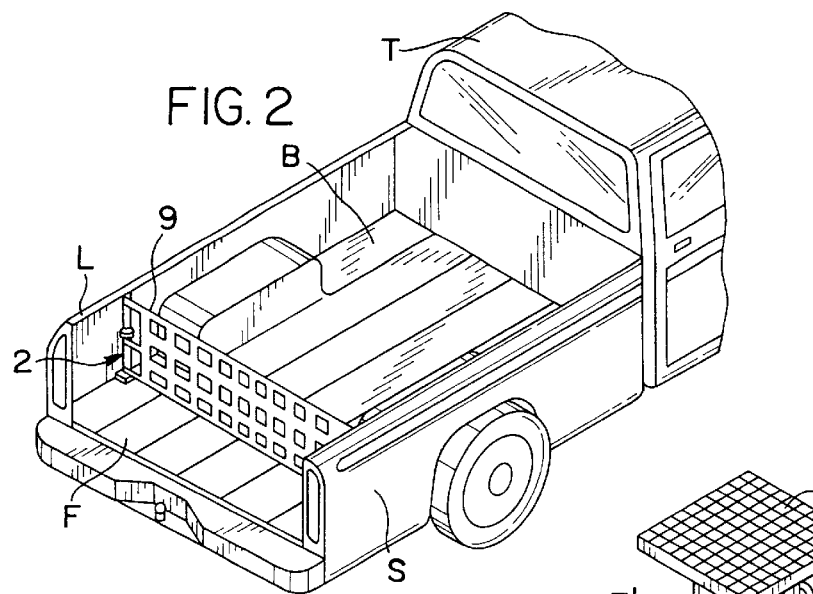
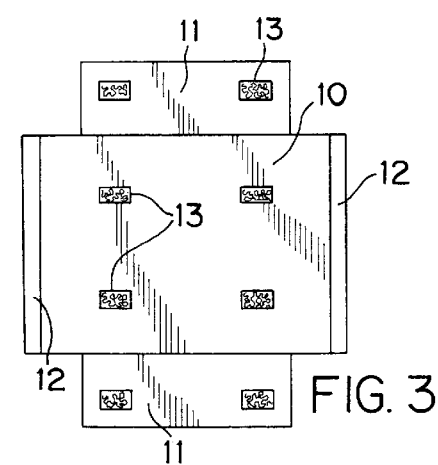
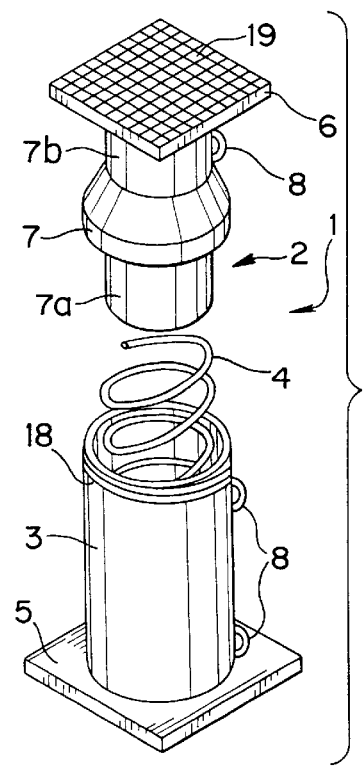
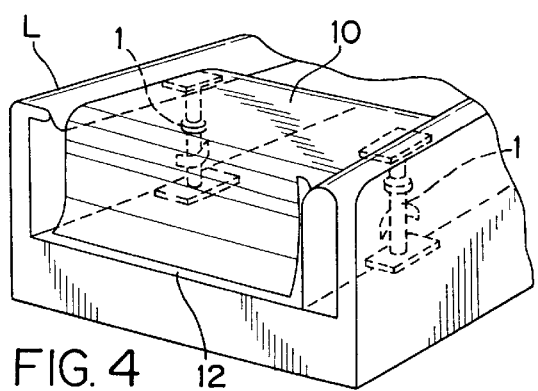
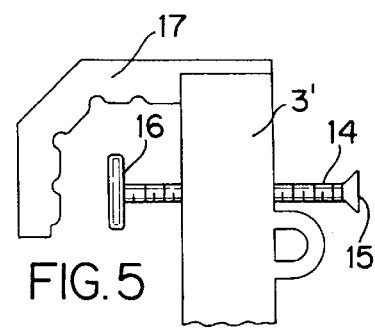

TRUCK BED ENCLOSURE ATTACHMENT POSTS

BACKGROUND OF THE INVENTION

The present invention relates generally to enclosure devices for the tailgate of a pickup truck, and in particular to an adjustable post providing an improved attachment means for net-type tailgate enclosures.

DESCRIPTION OF THE PRIOR ART

A variety of alternative tailgate enclosures for pickup trucks have been disclosed in the prior art. These inventions are generally aimed at providing tailgate enclosures which reduce aerodynamic friction and provide better rear visibility than that offered by standard factory tailgates. As described more fully below, however, there remains a need in the art for a versatile and convenient means for attaching alternative tailgate enclosure devices.

A popular type of tailgate enclosure is the net-type enclosure, as exemplified by the device disclosed in U.S. Pat. No. 4,930,834. This invention comprises a closely weaved plastic fabric having strap fasteners and a cylindrical plastic rod for attachment to brackets on a pickup truck bed. A drawback of this invention is that it requires the attachment of brackets to the pickup bed, which is inconvenient and esthetically undesirable. Additionally, it cannot be conveniently moved to different points along the length of the pickup bed, but rather must be secured wherever the brackets are installed.

U.S. Pat. No. 5,117,532 describes a protective apparatus for attachment to the exposed hinge plate walls of a tailgate opening, having loops for the attachment of a net-type tailgate enclosure. This invention is not readily adjustable to fit different size tailgate walls, and further requires the insertion of a plurality of fasteners into the tailgate wall. This invention also suffers from the drawback that it cannot be placed at different locations in the truck bed.

U.S. Pat. Nos. 5,393,115 and 5,273,339 describe alternative tailgate assemblies for pickup trucks. The '115 Patent discloses a hinged beam attached to a post secured to the truck bed. The '339 Patent describes a tailgate enclosure comprising a tubular frame connected to a latching means that is attached to the truck bed wall. These inventions are not adjustable to fit different sized tailgates, nor do they provide for a convenient means to attach and remove the tailgate enclosures.

There remains a need in the art for a tailgate enclosure device which is capable of accommodating tailgate walls of different dimensions. There also remains a need for a tailgate enclosure device which can be used at different points within the truck bed, to secure loads of various sizes. Additionally, remains a need in the art for a tailgate enclosure apparatus that is inexpensive, convenient, and easily installed and removed. The present invention, described fully below, overcomes the shortcomings of the inventions heretofore disclosed and provides additional advantages not afforded by the prior art tailgate enclosure devices.

SUMMARY OF THE INVENTION

The present invention is an improved device for attaching netted fabric tailgates and other types of alternative tailgate enclosures. The invention comprises at least two posts, disposed adjacent to the opposing interior walls of a truck bed and having means for the attachment of a netted or other type of tailgate enclosure. Each post comprises a pair of cylinders, one received telescopically into the other, the upper cylinder being biased by a helical spring to a longitudinally extended position. Provided at the upper and lower ends of the respective cylinders are textured plates. In the biased position, the posts extend between the floor of the truck bed and the upper lip of the interior walls thereof, the textured plates providing a frictional grip. Hooks, loops, or other means are disposed along the length of each post, providing an attachment for the tailgate enclosure.

The attachment posts of the present invention may be installed on truck beds of various dimensions, as the spring biased posts are capable of adjusting to different lengths. The posts may be placed at different points along the length of the truck bed, to secure loads of various sizes. Additionally, there is no need to separately install brackets, screws, or any other unsightly or inconvenient devices to the bed of the pickup truck. The posts may be used to attach a variety of net-type and other tailgate enclosures.

Accordingly, it is an object of this invention to provide an improved tailgate enclosure device.

It is a further object of this invention to provide a tailgate enclosure device which is inexpensive, convenient, and east to install and remove.

It is still further an object of this invention to provide a tailgate enclosure device which may be used on truck beds of various dimensions.

It is still further an object of this invention to provide a tailgate enclosure device which can be placed at different points along the length of the truck bed to secure loads of various sizes.

These and other objects and advantages of the present invention will become readily apparent from the detailed description below, when taken in conjunction with the annexed drawings.

BRIEF DESCRIPTION OF THE DRAWINGS

FIG. 1 shows an exploded perspective view of an attachment post of the present invention.

FIG. 2 shows a perspective view of the present invention, installed in a pickup truck bed and securing a net-type tailgate enclosure thereon.

FIG. 3 shows a plan view of a rain cover used with the present invention.

FIG. 4 shows the rain cover in position over the bed of a vehicle.

FIG. 5 shows a side view of another embodiment of the attachment posts.

DESCRIPTION OF THE PREFERRED EMBODIMENT

Referring now to the drawings in greater detail, the present invention 1 may be seen in FIG. 1 comprising an upper cylinder 2 and a lower cylinder 3, the upper cylinder 2 being received telescopically into the lower cylinder 3. It may be further seen in FIG. 1 that the upper cylinder 2 is biased upward by a helical spring 4 received longitudinally between the cylinder 3 and the post 7a, 7b. Mounted on the post 7a, 7b is a compression nut 7. The post has a lower end 7a which fits into lower cylinder 3 and a top portion 7b which supports plate 6. Post 7a, 7b slides through nut 7. Nut 7 has internal threads (not shown) which engage external threads 18 to hold the post and cylinder in assembled condition. A number of looped members 8 are disposed on the side of the cylinders 2, 3, providing attachment means for a net-type tailgate enclosure 9, as described below. The cylinders 2, 3, the looped members 8, and the cap 7 may be constructed from glass-reinforced ABS plastic, aluminum, or any other inexpensive, strong, lightweight material.

Attached by any suitable means to the bottom of the lower cylinder 3 is a base plate 5 with a textured bottom surface. At the top of the post 7b is an upper plate 6 identical to the base plate 5. The plates 5, 6 are preferably constructed from hard rubber or some similar, semi-flexible material. The plates 5, 6 should have sufficient texture or treads or protrusions 19 so as to improve the gripping force upon installation of the invention 1, as described below.

FIG. 2 depicts the present invention 1 installed in the bed B of a conventional pickup truck T. As shown in FIG. 2, the bed B is defined by a floor F and two sidewalls S. Each sidewall S has an upper lip L extending a short distance into the bed area. The tailgate enclosure device of the present invention 1 is installed adjacent to the sidewall S, such that the upper plate 6 contacts the underside of the upper lip L of the sidewall S, while the base plate 5 rests on the floor F of the bed B. This is accomplished by manually depressing the upper plate 6, placing the invention 1 adjacent to the sidewall S, and then releasing the upper plate 6 and allowing the upper plate 6 to come into contact with the underside of the lip L. The helical spring 4 biases the upper plate 6 into the upper lip L such that the invention 1 is held securely in place by frictional force.

As shown in FIG. 2, a net-type, flexible tailgate enclosure 9 may be tied or otherwise attached to the looped members 8. Also, the two telescoping members 2,3 may be held together by any conventional means (not shown), such as a pin in one of the members 7a, 3 which cooperates with a slot in the other member. The pin and slot will allow the members 7a, 3 to move up and down, but will not allow them to separate completely.

In FIG. 3 a rain cover is shown which can be attached over at least a portion of the truck bed. The cover is preferably made of waterproof material. It has a center section 10, and two side sections 11, and a pair of flaps 12. Each of the center section and side sections have VELCRO type hook and loop fasteners 13, which will cooperate with similar fasteners attached to the truck to secure the cover over the attachment posts 1 (see FIG. 4) and a portion of the truck bed in order to keep any packages in the truck dry.

FIG. 5 shows a second embodiment of the attachment post which can be used with a truck bed that does not have an overhang or lip L at the top of the truck bed. The post 3' is a similar to the post 1 except it has a hook shaped portion 17, attached to the top by any conventional means, instead of the plate 6. The hook shaped portion 17 will be placed over the top of the side of the truck bed and then a threaded clamp 14 will be tightened against the side of the truck to hold the hook shaped portion 17 and the post 3' in position on the truck. The threaded clamp 14 will have a handle 15 for turning the clamp, and an enlarged portion 16 for bearing against the side of the truck bed.

The usefulness and advantages of the present invention 1 in securing a tailgate enclosure 9 will now be appreciated. The invention 1 eliminates the need to attach screws, brackets, or other devices directly to the truck bed to install a net-type tailgate enclosure and thereby damage the truck. The invention 1 may be used on many different sized trucks, and may also be attached at various points along the truck bed to accommodate different size payloads. It may be installed and removed quickly and easily, and it is inexpensive and lightweight.

Although the tailgate enclosure attachment device and the method of using the same according to the present invention has been described in the foregoing specification with considerable details, it is to be understood that modifications may be made to the present invention which do not exceed the scope of the appended claims and modified forms of this invention done by others skilled in the art to which the invention pertains will be considered infringements of this invention when those modified forms fall within the claimed scope of the invention.

What I claim as my invention is:

1. A tailgate enclosure attachment post assembly in combination with a cover for enclosing at least a portion of a truck bed, comprising:

means for enclosing a portion of a truck bed, said means for enclosing a portion of a truck bed extending from one side of said truck bed to another side of said truck bed, means for securing said post assembly to said truck bed, means for preventing said post assembly from horizontal slippage with respect to said truck bed, means for adjusting the height of said post assembly, whereby said post assembly is capable of fitting different size truck beds, and means for attaching said means for enclosing a portion of a truck bed to said post assembly, and wherein said cover has a center section and two side sections, each of said center section and said side sections having fastening means for attaching said cover to a vehicle, and wherein there is a flap attached to said center section on opposite sides of said center section, and wherein said center section is wider than said side sections.

2. The combination as claimed in claim 1 wherein said means for securing said post assembly to said truck bed is a hook shaped portion mounted at a top of said post assembly, and a threaded clamp which passes through said post assembly below said hook shaped portion.

3. The combination as claimed in claim 1, wherein said means for enclosing a portion of a truck bed is a netted fabric.

4. The combination as claimed in claim 1, wherein said post assembly comprises at least one post, said post comprises upper and lower portions, said upper portion being freely movable in a telescopic vertical direction within said lower portion, said upper portion having an upper member means fixedly attached thereto near a top of said upper portion and engages with an underside of a top lip of said truck bed, said lower portion being fixedly attached to a lower member means for engaging a floor of said truck bed.

5. The combination as claimed in claim 1, wherein said means for preventing said post assembly from slippage is a plurality of raised protrusions.

6. The combination as claimed in claim 1, wherein said means for adjusting said height of said post assembly is a helical spring enclosed between said upper and lower portions.

7. The combination as claimed in claim 1, wherein said means for attaching said means for enclosing a portion of said truck bed is a plurality of loops fixedly attached on an exterior of said post assembly.

* * * * *